Sept. 12, 1950 R. B. HOFFMAN ET AL 2,521,721

TWO-WAY COMMUNICATION SYSTEM

Filed Dec. 13, 1946 2 Sheets-Sheet 1

SLAVE STATION

INVENTORS
ROSS B. HOFFMAN
ROBERT C. FERRAR

BY Percy P. Lantzy
ATTORNEY

Sept. 12, 1950 R. B. HOFFMAN ET AL 2,521,721

TWO-WAY COMMUNICATION SYSTEM

Filed Dec. 13, 1946 2 Sheets-Sheet 2

INVENTORS
ROSS B. HOFFMAN
ROBERT C. FERRAR

BY Percy P. Lantzy

ATTORNEY

Patented Sept. 12, 1950 2,521,721

UNITED STATES PATENT OFFICE 2,521,721

TWO-WAY COMMUNICATION SYSTEM

Ross B. Hoffman, Glen Ridge, and Robert C. Ferrar, New Providence, N. J., assignors to Federal Telephone and Radio Corporation, New York, N. Y., a corporation of Delaware Application December 13, 1946, Serial No. 716,048

13 Claims. (Cl. 250—9)

This invention relates to two-way signaling, and more particularly to signaling systems for both transmission and reception of signals between stations.

The principal object of the invention is to provide a system of duplex operation between stations which are at varying distances from each other.

Single channel duplex radio communication between two stations has heretofore been proposed, based on time sharing at each station. In such an arrangement, each station has a transmitter and a receiver, and is operated so that its transmitter is transmitting for part of the time and its receiver is receiving during another part of the time. Such a time sharing arrangement between the transmitter and the receiver of a station has been accomplished by use of a keying device interconnected between the transmitter and the receiver of the station and functioning to allow the transmitter to transmit in timed pulses and allowing the receiver to receive during the intervals between the timed pulses of the transmitter.

Such single channel duplex radio communication between stations, depending on time sharing, has heretofore been considered to be subject to a disadvantage unless the stations communicating with each other are separated by a fixed distance. This disadvantage when the separation between the stations is variable, as where one of the stations is in a moving vehicle, has arisen from the transit delay required for a radio wave to travel between the two stations. The effect of the transit delay is to delay the receipt at the receiving station of the pulses sent out by the transmitting station; accordingly, a variation of the time of transit affects the time relationships of the pulses in the system. The difficulty due to variable transit time is not present where the station separation is fixed, as in such cases the transit time is a constant; and it can readily be compensated by delay networks in the system, if desired. It is not as practical, however, to compensate by delay networks for a variable transmission delay arising from a varying separation of the stations.

In such duplex systems, it has ordinarily been required that one station, often called a master station, be used to determine the pulse repetition rate of transmission for the system. Ordinarily the master station has been arranged to transmit pulses at a predetermined average rate so that the alternate transmission and reception can occur; and the average pulse rate has normally been chosen so that the frequency of recurrence of the pulses is somewhat higher than the highest intelligence frequency to be transmitted. The other station or stations in the system, often called slave stations, will synchronize with the pulses from the master station, and are ordinarily arranged to transmit a pulse, similar to the master station pulse, for each pulse received from the master station but delayed in time so as not to conflict with the master station pulse.

In such a system, the degree of reception from one station to the other varies with varying separation between the stations. For example, there is some particular distance between the stations at which the total time required for the wave to travel from the master station to the slave station and through the slave station plus the time required for a wave to travel from the slave station to the master station is equal to a full pulse period. Under this particular circumstance, the transmission periods of the master station coincide with the periods of reception at the master station from the slave station; and accordingly, reception from the slave station is blanked out. But when the separation between the stations changes from this particular separation, different portions of the receiving time period will be occupied by the transmitting time period of the master station; and there will be some other particular distance at which the freedom of the receiving time periods from the transmission time periods will be maximum.

In view of the varying degrees of interference at the different distances of separation, it has heretofore been customary to operate both stations so that the time during which each transmitter operates is relatively small in comparison to the time separating successive pulses. In this way, a considerable range of separation distances between stations may be had without incurring substantial or total interference of the times of transmission and reception at either station. The interference, however, is never completely eliminated by this practice, and there still remains some critical station separation at which reception at the master statiion is very difficult or impractical. Moreover, it is usually not desirable to increase the time interval between transmitted pulses as this undesirably widens the frequency spectrum needed by the system for its operation.

According to our present invention, we propose to eliminate or reduce the foregoing disadvantages of the prior known time sharing systems. Our novel system will provide satisfactory single channel duplex communication at any separation distance between the stations; and the maximum usable separation distance will be dependent only upon the usual considerations of transmitted power, receiver sensitivity, propagation characteristics, and the like.

Our novel system involves transmission by the master station of timed pulses which occur at a predetermined repetition rate, the duration of each transmitted pulse being less than the time between successive pulses. We synchronize the slave station with the master station and cause it to transmit pulses at the same rate as those transmitted from the master station, but appreciably longer in duration. Accordingly, since the period during which a received wave is arriving at the master station from the slave station is longer than the period of transmission of pulses by the master station, there can never be complete interfence at the master station, since at least a portion of the pulse received from the slave station transmitter will always lie in a time zone free from the time periods of the master station's transmitted pulses, and can accordingly be made available for reception at the master station. Furthermore, there will never be any interference at all at the slave station because the slave station's transmitted pulses will be synchronized to occupy time periods between the pulses received from the master station.

The foregoing and other features of our invention will be better understood from the following detailed description and the accompanying drawings of which:

Figure 1:
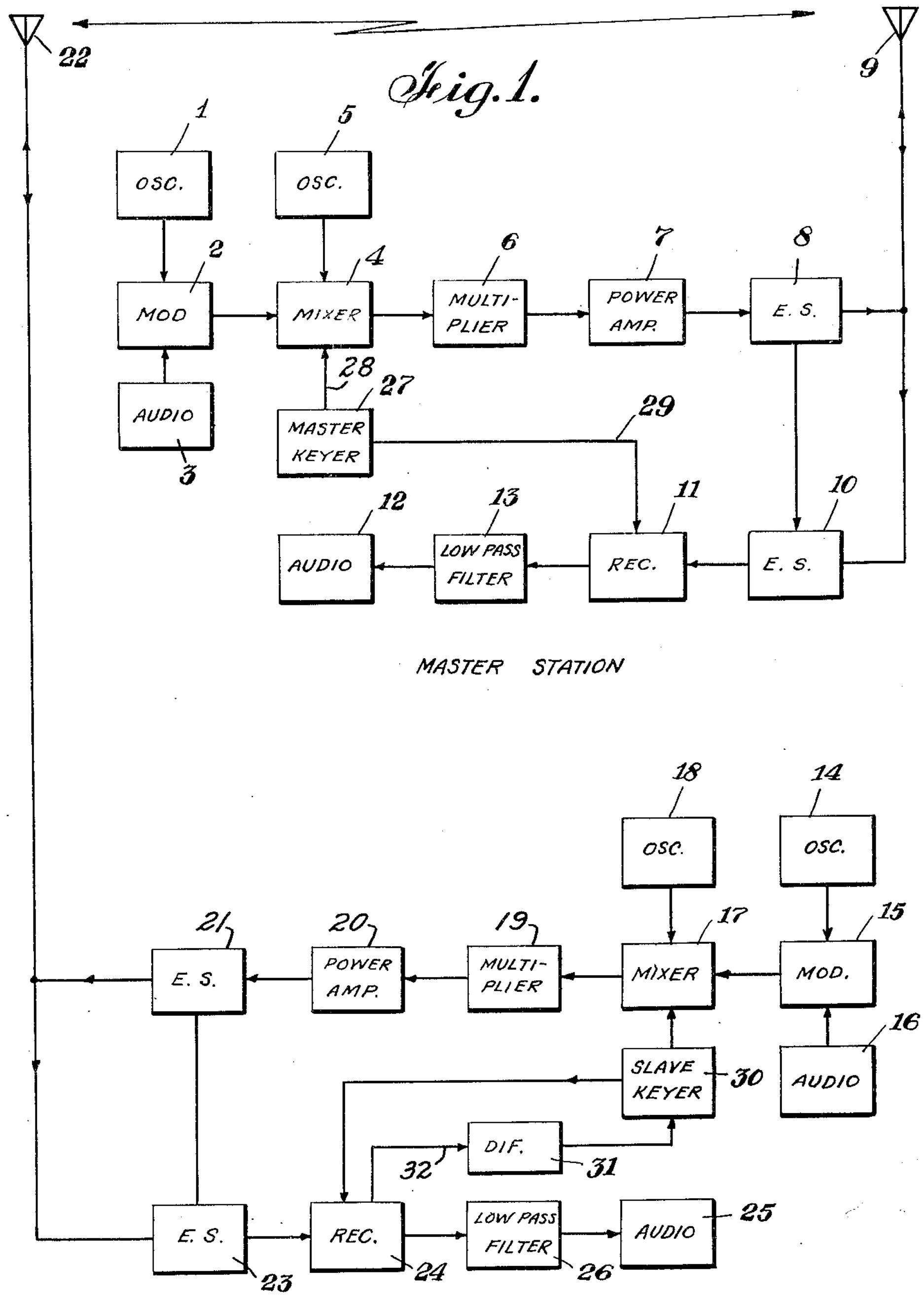
Fig. 1 shows a signaling system operated according to our invention.

Although the time pulse arrangement of the invention is not dependent on the particular pieces of apparatus used at the stations, some suitable kind of apparatus will be required; and one suitable station arrangement for producing the pulse interrelationship is shown in Fig. 1. Fig. 1 shows in block diagram form a duplex signalling system operated according to our invention. The master station will ordinarily be the central station of the system, and the slave station may be a mobile station, ordinarily one of a number of field stations, such as in a moving vehicle although it is immaterial which of the two stations moves, or whether both of them move.

Although any suitable type of intelligence modulation of the transmitters may be accomplished, for example, amplitude, frequency, or phase modulation, the particular system illustrated in Fig. 1 is assumed to be a phase modulated system. As the particular design and form of the individual elements of the stations are not of particular importance insofar as the invention is concerned, the individual elements in the following description are not described in detail as they are individually well known by those skilled in the art.

Referring to the equipment at the master station, it comprises a radio transmitter and a radio receiver, both being adapted to operate over the same antenna. The apparatus comprises the ordinary phase modulation equipment: an oscillator 1 is used to generate a carrier frequency, the output of the oscillator being impressed on a modulator 2 on which is also impressed the output of an audio frequency pickup 3 carrying the intelligence signals. The modulated carrier from the output of the modulator 2 is impressed on a mixer 4 on which is also impressed the output of a carrier frequency oscillator 5; and the phase modulated output of the mixer is impressed on the frequency multiplier 6 and thence to a power amplifier 7. The output of the power amplifier is sent through a suitable electronic switching device 8 to a radiating antenna 9, from whence the signals are transmitted by radio to the slave station.

The receiver at the master station likewise contains the following conventional apparatus: reception is had on the same antenna 9 as is used by the transmitter, the incoming modulated carrier being sent through a suitable electronic switch 10 and thence to a suitable phase modulation radio receiver 11. The output of the receiver is carried to a suitable audio reproducing device 12, preferably through a low-pass filter 13.

The equipment at the slave station comprises apparatus quite similar to that at the master station. The phase-modulated system comprises a carrier frequency oscillator 14, a modulator 15, an audio frequency apparatus 16 operated into the modulator. The output of the modulator is carried to mixer 17 on which is impressed the frequency of oscillator 18 and the output of which is impressed on frequency multiplier 19. The output of the multiplier is carried to the power amplifier 20 and thence through the electronic switching device 21 to antenna 22. The receiver at the slave station makes use of the antenna 22 from which the received signals are carried to the electronic switch 23 to the receiver 24, the output of which is carried to the audio frequency responsive device 25 through the low-pass filter 26.

Reception to and from the two stations, being over a single channel, utilizes the same carrier frequency; and accordingly, provision is made for duplex operation. For this purpose there is provided at the master station a master keyer 27. The keyer may be a suitable oscillator, such as a relaxation oscillator; and preferably it is of the unbalanced multi-vibrator type. The master keyer 27 is adjusted to be free running at a fixed rate; that is, its normal frequency is adjusted to establish the period of the pulses which are transmitted by the transmitter at the master station.

The output from the master keyer 27 is carried over line 28 to a control element of the transmitter, which may conveniently be the mixer 4 as shown; and another part of the output from the keyer is carried over a line 29 to a control element of the receiver. The correlation is such that the transmitter is rendered operative by the voltage peaks of the keying oscillator wave, for example, either the upper peaks or the lower peaks. If for example the upper peaks are used to produce the transmitter pulses, the peak voltages of the keying oscillator wave will bias a tube or element of the transmitter to render it operative for a predetermined period of time at the peak of the keying oscillator wave. According to the practice of our invention this time of transmission of the transmitter will be somewhat less than half the time, and accordingly only the upper parts of the peaks will be used to render the transmitter operative. In this way spaced pulses will be transmitted from the transmitter, and the duration of the pulses will be less than half the time of a cycle of the keying oscillator.

The voltage from the keying oscillator applied to the receiver will be arranged to make the receiver operative during the parts of the keying oscillator cycle when the transmitter is rendered inoperative, and inoperative while the transmitter is operative. Thus, the receiver at the master station will receive signals during parts of the keying oscillator cycle which is more than half the time of a cycle. Accordingly, the master station is adapted to receive pulses of longer duration than the pulses which it transmits.

The keying oscillator is preferably tuned to a frequency somewhat above that of the highest intelligence frequency which is being used. A keying oscillator frequency of around 6000 cycles has been found satisfactory and this may readily be used where the highest intelligence frequency is around 3000 cycles.

The transmitter-receiver selection devices 21 and 23 are for the purpose of rendering the transmitter and receiver operative during their time periods of operation, and inoperative during their time periods of non-operation. Each of these devices may conveniently be in the form of an electronic switch, preferably operated by a gaseous discharge tube included in a resonant L-C circuit. Thus, the electronic switch of the device 21 is operated upon by the pulses sent out from the power amplifier 20 so as to provide a transmission path to the antenna during the period of the pulses, but to act as an open circuit during the non-transmission periods between pulses. In this way, the transmitter is effectively disconnected from the antenna during the times allotted the receiver and thus will not act as a shunt across the receiver which would otherwise reduce the receiver sensitivity.

The pulses sent through device 21 from the transmitter are adapted to operate on the electronic switch of device 23 in such a way that a short circuit is effectively connected across the input of the receiver during the time of the transmitter pulses; and this prevents the transmitter pulses of the master station from being sent back through its receiver. At all other times the short circuit is removed from across the receiver and the receiver will operate to receive normally during its allotted time periods.

The low pass filters 13 and 26 in the receivers of both stations are desirable because they can be designed to flatten out the overall frequency response of the audio signal frequencies, as is commonly desirable in phase modulation systems; and has the additional function of removing beat frequencies which may result from mixing of the pulse frequency and frequencies within the audio modulation range. For example, if the system were to be used for radio communication with a maximum transmitted audio frequency of 3000 cycles per second, the low pass filter should preferably have a cutoff at about 3000 cycles per second. With a selection of a pulse frequency of more than 6000 cycles per second, the beats between the pulse frequency and the highest audio frequency of 3000 cycles per second, would then lies above the filter cutoff frequency and thus be eliminated.

The slave station is provided with a keyer 30 which is arranged somewhat different from the master keyer 27 of the master station. The slave station keyer may be very similar to that at the master station in that it may comprise an unbalanced multivibrator which is free running in the absence of a received signal from the master station. This free running frequency should, furthermore, be designed to be the same as that of the master keyer 27 so that the slave station can function to call the master station even though the master transmitter is inoperative. It is important, however, that the slave keyer should be designed to be synchronized by the pulses from the master keyer, and preferably by the lagging edges of the received pulses from the master station. This can be accomplished by suitable design of the slave keyer 30 as will be understood by those skilled in the art. An effective way of doing this is by use of a differentiating circuit 31 in a line 32 between the receiver and a control element of the slave keyer.

As is well known in the art, a differentiating circuit is one which produces sharp peaks at the leading and trailing edges of the pulses at the receiver. Thus, the line 32 from a suitable electrode or point of the receiver carries the received pulses to the differentiating circuit 31 which forms the desired sharp peaks at the leading and trailing edges of the pulses, the output of the differentiating circuit is taken to a control element of the slave keyer to synchronize the keyer with the received waves. In the present case, it is desired to start the transmission pulses from the slave station at the ends of the received pulses. Accordingly, the peaks of the differentiator corresponding to these trailing edges of the received pulses are utilized to trigger the slave keyer in a manner well understood in the art, to set off the slave keyer on that part of its cycle which makes the slave transmitter operative.

Figure 2:
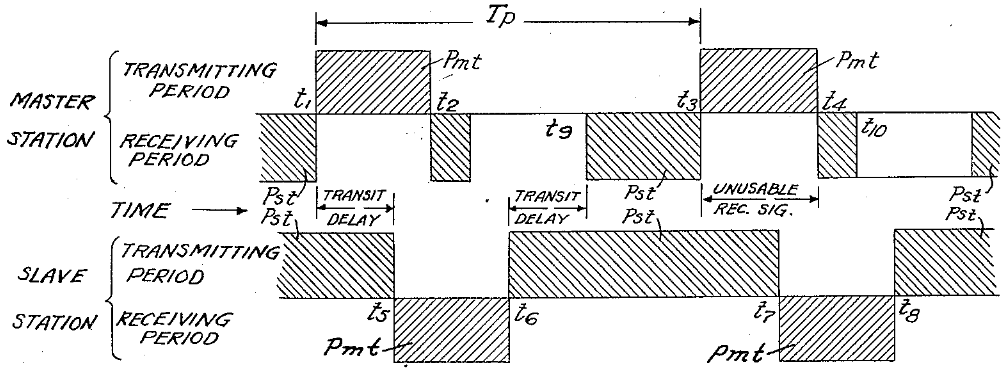
Fig. 2 shows time relationships of pulses received and transmitted between stations, in accordance with our invention.
Figure 3:
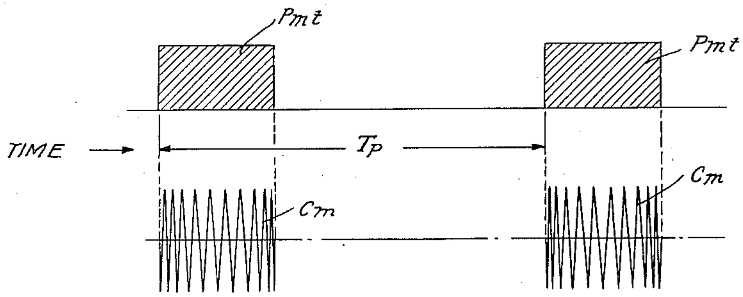
Fig. 3 shows graphically the wave composition of the pulses.
Figure 4:
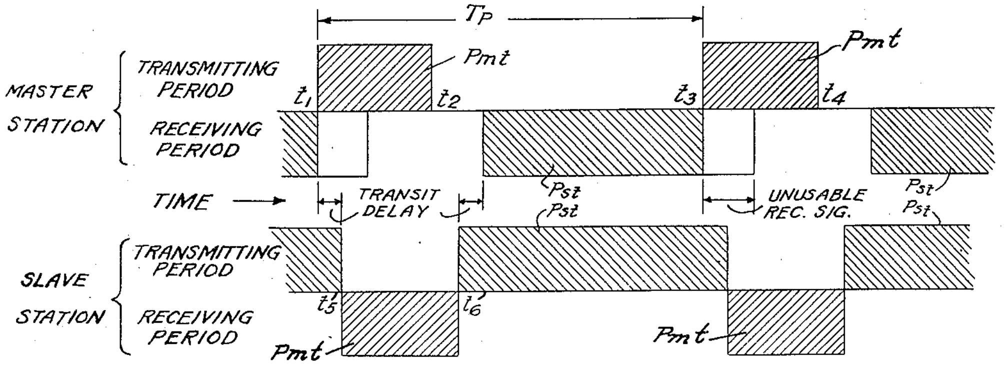
Fig. 4 shows the relationship of the transmitted and received pulses with a different distance between stations from the case of Fig. 2.

The manner of operation of the system in accordance with our invention can be better understood from Figs. 2 to 4 which are graphical representations of the interrelationships of the pulses at the stations. In these graphs, the abscissas represent time and the ordinates represent pulse intensity or voltage. Referring to Fig. 2, there are shown two abscissas, the upper abscissa having thereon the pulses transmitted by the master station, and the lower abscissa having thereon the pulses transmitted by the slave station. According to the operation of the master keyer 27, the master station transmits a series of pulses $P_{mt}$, the leading edges of which are spaced apart by a time $T_p$ which is the pulse period as determined by the time of a cycle of the master keyer. Each of these transmitted pulses is in the form of a so called square pulse that is, it has substantially vertical leading and trailing edges with a substantially flat top. The leading edge of the first master pulse in Fig. 2 is shown to be at a time $t_1$ and its trailing edge at a time $t_2$. The leading edge of the next pulse occurs at an interval time later $t_3$ and its trailing edge at $t_4$. These pulses $P_{mt}$ transmitted from the master transmitter will occur in a series at the regular spaced intervals apart $T_p$. They will be radiated from the transmitter by antenna 9 and be received sometime later at the slave antenna 22 and sent through the receiver of the slave station. This is represented in Fig. 2 by the same pulses marked $P_{mt}$ at the receiver of the slave station; but there is a delay in transit. Thus, the first pulse $P_{mt}$ sent out from the master transmitter at time $t_1$ is received at the slave station at some later time $t_5$ and ends at $t_6$. Likewise, the second transmitted pulse $P_{mt}$ transmitted between times $t_3$ and $t_4$ is received at the slave station at somewhat later times $t_7$ to $t_8$. The transit delay is accordingly $t_5$ minus $t_1$ which is the same as $t_7$ minus $t_3$.

The pulses at the receiver will serve to reproduce the signal intelligence at the audio output 25 inasmuch as each pulse $P_{mt}$ is composed of the phase modulated carrier signal wave $C_m$, as is illustrated graphically in Fig. 3; and since reception of this occurs a substantial part of the time, it will be received with substantial signal intensity.

Due to the triggering action of the differentiating circuit 31 on the slave keyer 30, the slave station transmits pulses during the time intervals between the pulses received from the master transmitter. The pulses of the slave transmitter are designated as pulses $P_{st}$, and occupy a substantially longer time period than the pulses of the master transmitter. These pulses from the slave station are radiated from the slave antenna 22 and received on the master antenna 9 and thence to the master receiver, at an interval of time later depending on the transit delay. Thus, the slave pulse beginning at time $t_6$ is received an interval of time later $t_9$, and extends at the master receiver until a time $t_{10}$. Since the transit delay is the same as in the case of pulses transmitted from the master station, the transit delay $t_9$ minus $t_6$ is equal to $t_5$ minus $t_1$ and is also substantially equal to $t_{10}$ minus $t_7$.

Since the master receiver is blocked during the period of time when the transmitter is transmitting the pulses $P_{mt}$, that part of the pulses received from the slave transmitter during this time of transmission of the pulses $P_{mt}$ will not be made available at the master receiver. This condition is represented by the cross hatching of those portions of the pulses $P_{st}$ which are received at the master station, and the lack of cross hatching where they are blocked out.

Although a substantial part of the pulse transmitted from the slave station is blanked out at the receiver of the master station, enough of it gets through for reception at the master station with sufficient and usable signal intensity. The reason for this lies in the feature of our invention whereby the master pulse occupies substantially less than fifty percent of the time, thereby allowing more than fifty per cent of the time for the slave pulse. Although the exact time of the pulses of the master and slave stations is not critical, a suitable timing has been found to be had when the master transmitter pulse is allowed to occupy about thirty per cent of the time and the slave transmitter pulse, the remaining seventy percent. This is the arrangement shown in Fig. 2, wherein the time interval $t_1$ to $t_2$ is thirty percent of the time $t_1$ to $t_3$. In the examples shown in Fig. 2, furthermore, the transit delay owing to stations separation is shown as twenty percent of a pulse period, that is, the time $t_1$ to $t_5$ is twenty percent of the time $t_1$ to $t_3$. This is the condition resulting in maximum interference of the master pulse with the slave pulse at the master station. In spite of this maximum interference condition represented by Fig. 2, the master station receives the slave signal during forty percent of a pulse period, that is, fifty-seven percent of the slave station transmission period. Accordingly under this circumstance, the receiver at the master station utilizes fifty-seven percent of the average power received from the slave station.

The slave station, of course, utilizes one hundred percent of the power received from the master station, since by its triggering operation at the lagging edge of a received pulse from the master station, the slave pulse is not transmitted until the end of reception of a master pulse period.

Under this circumstance, in order to maintain duplex system operation equivalent to operation in a system which does not depend upon pulse transmission, the master transmitter peak power should be increased over that of an unpulsed system by a factor of 3.3, although the average power does not change. The slave transmitter average power should correspondingly be increased over that of an unpulsed system by a factor of 1.75, and the peak power, by a factor of 2.5, assuming the same receiver sensitivity for both the pulsed and the unpulsed systems. Different relative transmission periods of the slave and master stations would, of course, make different power ratios desirable.

Fig. 4 is a graphic illustration showing that with a different station separation between slave and master stations, the situation is no worse and is even better than with the station separation represented by Fig. 2. In Fig. 4, the station separation is assumed to be substantially less than in Fig. 2 so that the pulse $P_{mt}$ sent out by the master station from times $t_1$ to $t_2$ is received at the slave station at times $t_5'$ to $t_6'$ instead of at times $t_5$ to $t_6$ as in Fig. 2. The time $t_1$ to $t_5'$ is less than the time $t_1$ to $t_5$. Under this condition the unusable part of the signal pulse $P_{st}$ transmitted from the slave station to the master station because of overlap in the period of the master station transmitter, is less than in Fig. 2.

Similarly, when the two stations are separated by a distance greater than that represented by Fig. 2, so that the transit delay is greater than the time of a pulse period, the interference patterns repeat.

It will be recognized from the foregoing discussion that by our invention we have provided a system and method of transmission of duplex single channel transmission between stations which will allow for varying separations between the stations without the existence of any separations at which transmission cannot be had, up to the limits of the station powers and sensitivity.

A good system utility, averaged over random spacings between the master and slave stations, will result from a transmission period at the slave station which is sufficiently longer than that at the master station, so that the sum of slave and master transmission periods is equal to a full pulse period. The actual ratio which is selected for the slave to master transmission periods will depend to some extent on economic considerations, as this ratio is related to power output and receiver sensitivity. The pulse repetition rate which is selected will be determined in large part by the type of intelligence to be transmitted.

If distortion due to beats between the pulses and the intelligence modulation is to be avoided, the pulse rate should preferably be chosen so that beat frequencies produced by combination of the pulses with intelligence frequencies do not lie within the intelligence frequency range. The pulse frequency and beat frequencies may then be removed at the receiver by suitable audio-frequency filter circuits.

Although Fig. 1 illustrates a particular system arrangement for creating the mode of transmission indicated in Figs. 2 and 4, it will be understood that the mode of transmission according to our invention is not dependent on the particular system, and that the system is illustrated and described by way of example rather than of limitation. It will be recognized that other arrangements of the system and kinds of apparatus than the particular ones described may be used to bring out the pulse arrangement according to the invention.

Furthermore, no particular kind of modulation is essential in the signalling system. Intelligence modulation of the transmitters may, for example, be accomplished by amplitude, frequency of phase modulation methods, it only being required that modulated carrier be transmitted in the form and arrangement of the pulses as hereinabove set forth.

We claim:

1. A single channel modulated carrier frequency signalling system for two-way communication between a master station and a slave station having a non-constant distance of separation between them, each station having a transmitter and a receiver, a time dividing means at each station for causing transmission in spaced pulses and allowing reception at times other than the times of the spaced pulses, the time dividing means at the master station being preset to produce the transmission pulses from the master station transmitter at predetermined times, the time dividing means at the slave station being synchronized by the pulses from the master station to operate the slave station transmitter to transmit pulses during times between the reception at the slave station receiver of the pulses transmitted from the master station transmitter, the time duration of the transmitter master station pulses being less than the time duration of the transmitted slave station pulses, whereby the master station receiver is able to obtain reception of the slave station transmitted pulses at varying separations between stations.

2. A single channel modulated carrier frequency signalling system for two-way communication between a master station and a slave station having a varying distance of separation between the stations, each station having a transmitter and a receiver and a keying oscillator adjusted to operate at a uniform rate and connected to produce operation of the transmitter at its station during part of its cycle and reception during the other part of its cycle, the time duration of the transmitted pulses being less than half the time and the time duration of the transmitted pulses at the slave station being longer than the time duration of the pulses at the master station, the keying oscillator at the slave station oscillating at the same frequency as the keying oscillator at the master station, means for synchronizing the slave station keying oscillator by the transmitted pulses from the master station so that the slave station pulses will occur at times other than the times of reception at the slave station of the master oscillator pulses whereby the master station receiver is able to obtain reception of the slave station pulses at all distances between stations up to the power and sensitivity limits of the system.

3. A system according to claim 2 in which the frequency of oscillation of the keying oscillators is above the highest intelligence frequency by which the carrier is modulated.

4. A system according to claim 2 in which the oscillation frequency of the keying oscillators is at least twice the highest intelligence frequency transmitted.

5. A system according to claim 2 in which the means for synchronizing the keying oscillator at the slave station with the pulses transmitted from the master station is a voltage peak-producing device which produces voltage peaks at the leading and trailing edges of the pulses received from the master transmitter, the peaks produced by the trailing edges being applied to an element of the slave keyer to produce a keyer cycle creating the pulses from the slave station transmitter.

6. A system according to claim 2 in which the means for synchronizing the keying oscillator at the slave station with the pulses transmitted from the master station is a differentiating circuit actuated from the receiver at the slave station, by the pulses received from the master station, to produce voltage peaks at the leading and trailing edges of said pulses, the peaks produced by the trailing edges being applied to a control element of the slave keyer to produce a keyer cycle in accordance with the timing of the master station pulses, and a connection from the slave keyer to the slave transmitter to produce slave transmitter pulses at times between the receipt at the slave receiver of the pulses from the master transmitter.

7. A single channel modulated carrier frequency signalling system for two-way communication between a master station and a slave station having a varying distance of separation between them, each station having a transmitter, a receiver, and an antenna time-dividing means at each station for causing transmission in spaced pulses and allowing reception at times other than the times of the spaced pulses, the time-dividing means at the master station being pre-set to produce the transmission pulses from the master station transmitter at predetermined times, the time dividing means at the slave station being synchronized by the pulses received from the master station to operate the slave station transmitter to transmit pulses during times between the reception at the slave station receiver of the pulses transmitted from the master station transmitter, the time duration of the transmitted master station pulses being less than the time duration of the transmitted slave station pulses, an electronic switching means at the transmitter of each station and an electronic switching means at the receiver of each station, the electronic switching means at the transmitters being operable by the pulses transmitted from the respective transmitters effectively to connect the respective transmitter with the respective antenna, while at the same time the electronic switch at the receiver of the corresponding station effectively disconnects said receiver from the antenna.

8. A system according to claim 2 in which the carrier frequency of the system is phase modulated.

9. The method of single channel duplex modulated carrier frequency signal transmission between a master station and a slave station which comprises transmitting from the master station a series of pulses at timed intervals, each pulse containing modulated carrier frequency waves, receiving said pulses at the receiver of the slave station, under synchronizing control by the pulses received from the transmitter circuit transmitting from the transmitter of the slave station pulses at the same timed rate as the pulses transmitted from the master station and containing modulated carrier signals in said channel, said slave station pulses being transmitted during time periods between receipt of pulses from the master station, but being of longer duration than the pulses from the master station, whereby regardless of the separation between the stations, the pulses transmitted from the slave station will be received at the receiver of the master station without interfering with the master station transmitted pulses.

10. The method of two-way radio communication between stations having a varying distance of separation between them which comprises transmitting a series of spaced pulses from a first of the stations, the duration of said pulses being less than half the time of the pulse cycle, receiving said pulses at the second of the stations, under synchronizing control by the pulses received from the transmitter circuit transmitting from the second station a series of pulses having the ame pulse cycle a the pulse cycle of the first station, the pulses being longer than those transmitted from the first station, and receiving at the first station at least part of the pulses transmitted from the second station.

11. The method of two-way single channel, modulated carrier frequency radio communication between stations having a varying distance of separation between them which comprises transmitting a series of spaced pulses from a first station, the duration of said pulses being substantially less than half the time of the pulse cycle, receiving said transmitted pulses at the second station, transmitting from the second station a series of pulses, and synchronizing the transmitted pulses from the second station by means of the pulses received from the first station, so that the second station pulses have the same pulse cycle as the first station pulses and occur at times between the receipt of the first station pulses, the pulses of the second station being longer than those transmitted by the first station, and receiving at the first station at least part of the pulses transmitted from the second station.

12. The method according to claim 10 in which the time of duration of the pulses from the first station is approximately 30% of the time of the pulse cycle and the time of transmission of the pulses from the second station is approximately 70% of the time of the pulse cycle.

13. The method according to claim 10 which comprises transmitting the pulses from the second station with more power than the pulses transmitted from the first station, in order to compensate for partial interference at the first station of the pulse transmitted from the second station.

ROSS B. HOFFMAN.
ROBERT C. FERRAR.

REFERENCES CITED

The following references are of record in the file of this patent:

UNITED STATES PATENTS

| Number | Name | Date |
|---|---|---|
| 954,651 | Marconi | Apr. 12, 1910 |
| 1,873,785 | Ranger | Aug. 23, 1932 |
| 2,089,639 | Bedford | Aug. 10, 1937 |
| 2,146,876 | Zworykin | Feb. 14, 1939 |
| 2,199,179 | Koch | Apr. 30, 1940 |